(No Model.)
F. HUBBARD.
FISHING HOOK AND LINE.
No. 372,677. Patented Nov. 8, 1887.
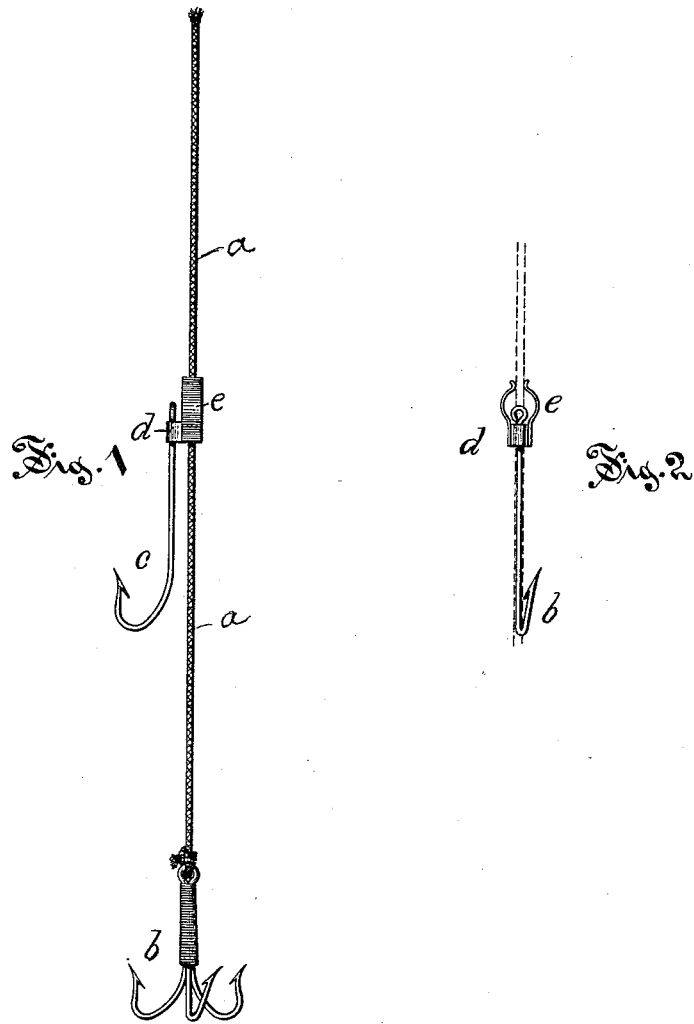
Witnesses:
W. M. Bjorkman
A. B. Jenkins
Inventor:
Fredrick Hubbard
by Simonds & Burdett,
Attys.

UNITED STATES PATENT OFFICE.

FREDRICK HUBBARD, OF BERLIN, CONNECTICUT.

FISHING HOOK AND LINE.

SPECIFICATION forming part of Letters Patent No. 372,677, dated November 8, 1887.

Application filed March 23, 1887. Serial No. 232,058. (No model.)

*To all whom it may concern:*

Be it known that I, FREDRICK HUBBARD, of Berlin, in the county of Hartford and State of Connecticut, have invented a certain new and useful Improvement in Fishing Hooks and Lines, of which the following is a description, reference being had to the accompanying drawings, where—

Figure 1 is a view of a gang of fish-hooks and a line embodying my improvement. Fig. 2 is a view of the slipping device shown in Fig. 1, but showing it turned ninety degrees.

My invention relates to the class of automatic fish-hooks, and its object is to so construct and arrange the hooks as to insure the entrapping of the fish and prevent its getting off after it has been once hooked.

My invention consists in a line having a hook or a gang of hooks securely fastened to the end thereof and a bait-hook attached to the line above the fixed hooks and adapted to slip down to the fixed hooks when any strain comes upon it; it also consists in details of the device, as more particularly hereinafter described, and pointed out in the claims.

In the accompanying drawings, the letter $a$ denotes a fish-line, to the lower end of which is fixedly attached a gang of hooks, $b$. When I say "fixedly attached," I mean that the attachment is direct, immediate, and positive, without the intervention of any spring or other device.

The letter $c$ denotes the upper hook, whose mode of attachment to the line is that of a slip attachment, by which I mean that a pull upward on the line or a pull downward on this hook $c$ will cause this hook $c$ to slip downward toward the lower hooks, $b$.

The letter $d$ denotes a small ring attached to the hook $c$ and encircling the fish-line. This ring bears a couple of spring-fingers, $e$, which grasp the line with a pressure sufficient to hold this hook to the line at whatever point thereon it may be adjusted, under normal conditions and when the hook is undisturbed; but this pressure of these spring-fingers on the line is not so great but that a pull upward on the line by the fisherman or a pull downward on the hook $c$ by a fish will cause this hook $c$ to slip on the line.

The mode of use is to adjust the upper hook, $c$, two or three inches above the lower hooks, $b$, and bait the upper hook. Then when a fish takes hold of the bait and the fisherman naturally pulls up on the line the lower hooks will be brought up against the under jaw of the fish and firmly secure him.

The slip attachment of the upper hook might be brought about by a helical spring with its upper end fixedly attached to the line and its lower end attached to the upper hook with the line running through the spring.

I am aware that fish-hooks have been made with catches and springs to hook fish when they nibble; but such prior devices are cumbersome and unsightly and frighten away the fish by their operation, while my device is simple and operates noiselessly and without making any commotion.

I claim as my improvement—

1. In combination with the line $a$, the lower fixed hooks, $b$, attached thereto, and the upper hook, $c$, provided on its shank with spring-fingers grasping the line, all substantially as described.

2. As a new article of manufacture, a fish-hook, $c$, with a perforated head, $d$, attached to the shank, the said perforated head bearing spring grasping-fingers, all substantially as described, and for the purpose set forth.

FREDRICK HUBBARD.

Witnesses:
GEORGE SCOTT,
A. A. BARNES.